United States Patent [19]

Mosciatti et al.

[11] 4,216,889
[45] Aug. 12, 1980

[54] VACUUM TANK FOR MAGNETIC TAPE HANDLERS

[75] Inventors: Roger Mosciatti, Coram; Thomas P. Foley, Lloyd Harbor; Frederick G. Moritz, Hauppauge, all of N.Y.

[73] Assignee: Potter Instrument Company, Inc., Plainview, N.Y.

[21] Appl. No.: 8,553

[22] Filed: Feb. 2, 1979

[51] Int. Cl.² .............................................. G11B 15/58
[52] U.S. Cl. ..................... 226/118; 226/95; 242/182
[58] Field of Search ................. 226/118, 95, 200; 242/182, 183, 184, 185

[56] References Cited

U.S. PATENT DOCUMENTS

| | | | |
|---|---|---|---|
| 2,968,702 | 1/1961 | Fay | 226/95 X |
| 3,217,956 | 11/1965 | Nesezchleb | 242/182 |
| 3,254,855 | 6/1966 | Rayfield | 242/185 |
| 3,627,226 | 12/1971 | Setter | 242/185 |
| 3,866,855 | 2/1975 | Bryer | 242/184 |

Primary Examiner—George F. Mautz
Attorney, Agent, or Firm—Alfred W. Barber

[57] ABSTRACT

A one piece extrusion provides the base for a simple and effective vacuum tank for magnetic tape handlers. The extrusion carries longitudinal slots which accept stamped metal nuts. These nuts are readily positioned by sliding them along the slots. Slots along the edges of the extrusion are used to carry nuts holding hinges for a plastic cover over the tank front. Slots along the back and near the edges of the extrusion carry nuts for mounting the tank on the tape handler main frame. A longitudinal slot along the back of the extrusion and spaced in from one edge carries spring-loaded tubular inserts for attachment to the vacuum sensing tubes. Communication with the vacuum chamber is implemented by means of holes at appropriate places along the body of the extrusion.

1 Claim, 4 Drawing Figures

U.S. Patent  Aug. 12, 1980  4,216,889
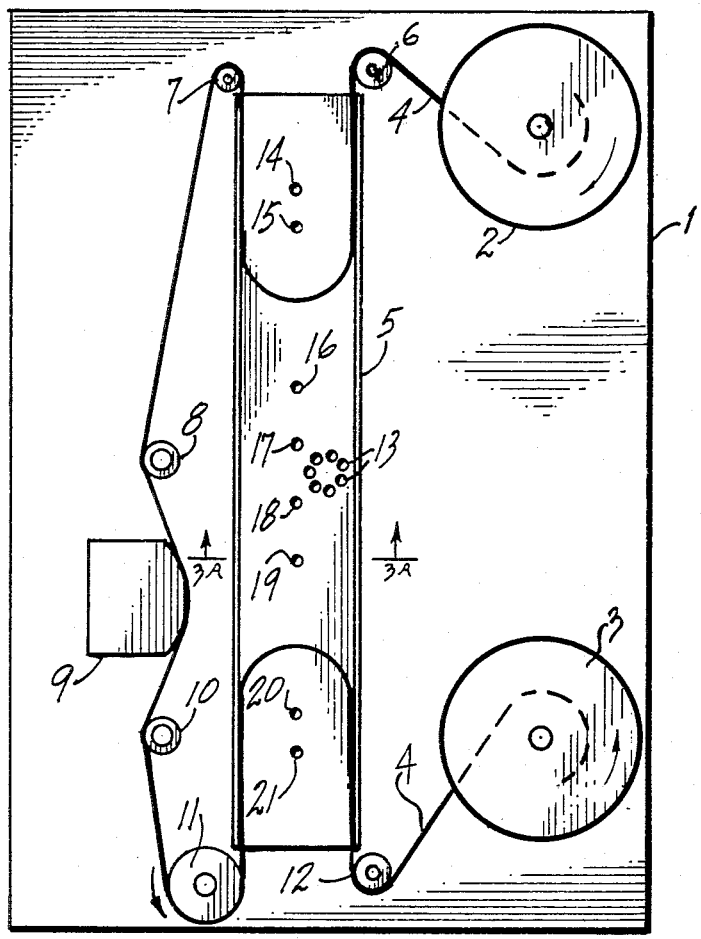
Fig. 1
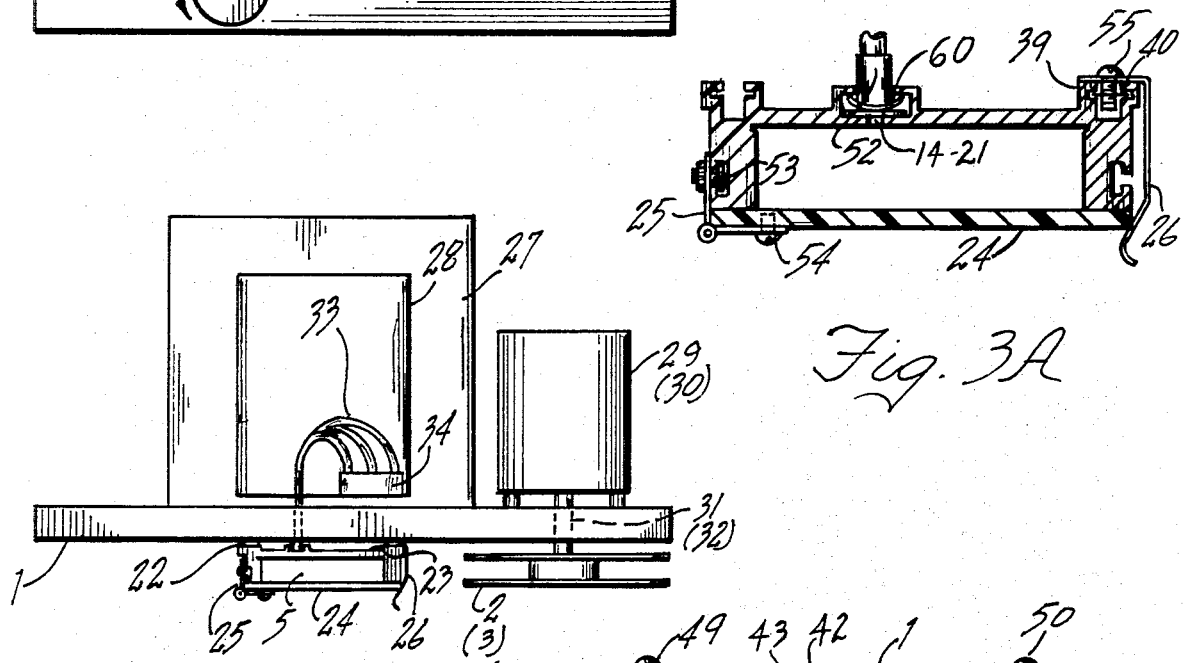
Fig. 2
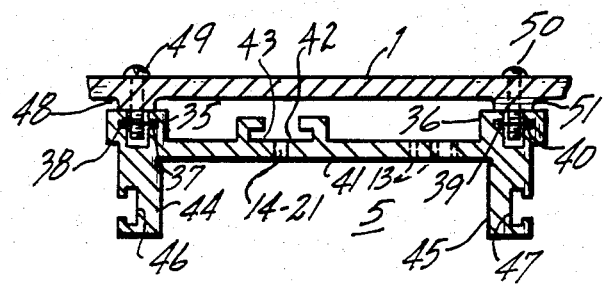
Fig. 3A
Fig. 3B

VACUUM TANK FOR MAGNETIC TAPE HANDLERS

PRIOR ART

Vacuum chambers for magnetic tape handlers in the past have been generally provided by complicated machining of metal castings. All mounting holes were drilled and tapped. Holes for the vacuum sensing tubes were drilled and tapped and machined fittings were inserted. Holes for cover hinges were drilled and tapped. Taken all together, the typical prior art vacuum chamber was heavy, complicated and expensive to make.

PRESENT INVENTION

It has been found that an aluminum extrusion can be designed and extruded to provide all the essentials of a simple, easy to handle and inexpensive vacuum chamber. T-shaped slots in the extrusion are provided to retain spring metal nuts. Two such slots along the rear edges of the extrusion hold mounting nuts for bolting the extruded chamber to the main frame of the tape handle. Slots along either edges of the extrusion hold mounting nuts for hinges to mount a front cover. Another slot along the rear of the extrusion holds nuts carrying inexpensive molded plastic tubular fittings for attachment to the vacuum sensing tubes. These latter can be located and implemented at any desired points simply by making a hole through the body of the extrusion and sliding the tube over the hole. Each fitting is held in place by a wavy washer which fits between the fitting's enlarged head and the under side of the "T" slot flanges. A sensor location may be changed simply by plugging the first hole and making a new one and sliding the fitting over the new hole.

In the drawing:

FIG. 1 is a simplified drawing of the front view of a typical tape handler embodying the invention.

FIG. 2 is a simplified drawing of the top view of the tape handler of FIG. 1.

FIG. 3A is a sectional view across line 3A—3A of FIG. 1 of the extruded vacuum tank, the preferred form of the invention.

FIG. 3B is a sectional view across line 3A—3A of FIG. 1 showing how the extruded vacuum tank is attached to main panel 1 by means of nuts and bolts.

In FIG. 1 a main panel 1 carries tape reels 2 and 3, vacuum tank 5 and record/playback head mounting 9. The upper reel 2 is generally designated as the supply reel and lower reel 3 as the take-up reel. Recording tape 4 during recording or play-back passes over a path as shown. It first, on leaving supply reel 2, passes over supply tachometer 6, into the upper end of vacuum tank 5, out over idler roller 7, downward and under tape guide 8, over curved block 9 which contains the record/playback head, under tape guide 10, around drive capstan 11, into the lower end of vacuum tank 5, out over take-up tachometer 12 and up and over and onto take-up reel 3. The tape is moved solely by capstan 11 while the rest of the system acts to store the tape and to maintain constant tension in both directions from the capstan. A cover 24 is hinged on one side of tank 5 and when closed, covers the open front in order to maintain vacuum within the tank.

The end view of the tape handler in FIG. 2 shows how vacuum tank 5 is mounted on bosses 22 and 23 on panel 1. Also shown is cover 24 hinged on one side by hinges 25 and held closed by spring catch 26. On the rear of panel 1 a shelf 27 holds vacuum blower 28 which provides the vacuum for the vacuum tank. The ports 14 through 21 (of FIG. 1) are connected to a control unit 34 through various hoses 33. Reels 2 (and 3) are turned by servo motors 29 (and 30) over shafts 31 (and 32). Vacuum is pulled in vacuum tank 5 by vacuum blower 28 acting through ports 13 (FIG. 1).

Taking FIGS. 1 and 2 together, vacuum is maintained in tank 5 by vacuum blower 28 acting through ports 13 in the rear wall of vacuum tank 5. Ports 15 through 21 are vacuum sensing ports in the rear wall of tank 5 and they are connected to sensing unit 34 by means of flexible hoses 33. The tape position shown in FIG. 1 is called the "park" position, i.e. the position of the tape when the system is at rest. When a start command is given, reels 2 and 3 are rotated by their respective servo motors in the directions shown by the two arrows and the capstan is rotated forward in the direction shown by the third arrow. The tape positions in the tank are monitored by the supply tachometer, the capstan trachometer and the take-up tachometer. Initially the tape is fed into the tank by supply reel 2 too slowly to maintain the park position and it moves upward. When port 15 senses the tape passing it, the supply servo is run at 90 percent of the speed which the tachometers indicate will maintain the loop. This causes the loop to rise even higher. When it is sensed at port 14, the servo is commanded to run at 110 percent of the speed required to maintain the loop. This causes the loop to drop passing port 15 and returning the servo to 90 percent speed. The process repeats so that the tape oscillates in speed crossing and recrossing port 14. Should the tape speed be too great and such that the tape drops deeply into the chamber, port 16 may be crossed by the tape causing a reverse run command to the reel servo. If it still drops and crosses port 17 the reverse speed is increased.

The lower loop is maintained in a similar way with sensing at ports 18 through 21 and all motions in reverse of those of the upper loop described above.

The above description has been given to establish the usefulness of the vacuum chamber 5 in a typical tape handler. The locations of ports 14 through 21 are determined by the responses of various ports of the system. It may be found, for example. that one ormore ports must be moved from their original locations due to differences in response of the servo motors from an initial design to a final operating machine. In the past, vacuum chamber 5 has been machined from a heavy piece of aluminum alloy. The ports were provided by tapped holes at predetermined locations. To move a port meant filling a first hole and drilling and tapping a second. The whole machining operation was time consuming and expensive.

It has been found that an extrusion can be designed and formed which provides more convenience in case of port hole changes and which is much easier to use and much cheaper than the machined chamber.

FIGS. 3A and 3B are cross sections of this new extruded chamber. This extrusion is made into a finished vacuum chamber merely by cutting to the desired length, drilling holes for the ports, and some additional minor geometric machining. The extrusion comprises a flat body 41, rear bosses 35 and 36 provided with channels 37–38 and 39–40, a rear channel 42–43, two front bosses 44 and 45 carrying channels 46 and 47 respectively. These channels can be used in several convenient ways. Channels 37-38 and 39-40 can accommodate flat nuts (Tinnerman speed nuts for example). Machine screws 49 and 50 passing through base plate 1 and bosses 48 and 51 are used to mount vacuum chamber 5 on base plate 1. Since these nuts slide readily in these channels, no close tolerance in hole positions is necessary to provide this mounting. The sensing port hoses are terminated in fittings 52 carrying wavy washers 60. Again no close matching of machined holes is required. The hose fittings are merely pushed along slot 42-43 until they match the holes drilled in the body 41. Moving a port entails simply filling one hole, drilling another hole and sliding the hose termination over it. The front of the extrusion carries two raised rails 44 and 45 one along each side of the extrusion. These are slotted at 46 and 47 respectively. These latter slots are adapted to retain the head of a machine screw such as at 53. Cover 24 is mounted by means of hinge 25 (and a second similar hinge not shown) by machine screw 53 held in slot 46 and machine screw 54 engaging one edge of cover 24. Cover 24 is held closed by a spring catch 26, one end of which is held by a screw 55 engaging a nut in slot 39-40. Rail 45 with its slot 47 can be used to retain hinges in case it is desired to hinge cover 24 in the reverse direction.

While the preferred form of the present invention has been shown and described above, modifications are possible within the spirit and scope of the invention set forth, in particular, in the appended claims.

We claim:

1. In a magnetic tape handler, a vacuum tank including;

a metal extrusion comprising a rectangular flat body several times longer that it is wide with rectangular projecting sides along the edges of said body and forming a rectangular channel therewith;

undercut longitudinal channels along both edges of said body opposite said projecting sides for receiving mounting bolts for securing said body to a main frame;

undercut longitudinal channels along the outer sides of said projecting sides for receiving mounting bolts for mounting cover hinges or the like;

and a raised undercut channel along said body on the side of said body opposite to the side carrying said projecting sides for receiving vacuum sensing hose terminals.

* * * * *